United States Patent [19]

Peiffer et al.

[11] Patent Number: 4,640,945

[45] Date of Patent: * Feb. 3, 1987

[54] DRAG REDUCTION WITH NOVEL HYDROCARBON SOLUBLE POLYAMPHOLYTES

[75] Inventors: Dennis G. Peiffer, East Brunswick; Ralph M. Kowalik; Robert D. Lundberg, both of Bridgewater, all of N.J.

[73] Assignee: Exxon Research and Engineering Company, Florham Park, N.J.

[ * ] Notice: The portion of the term of this patent subsequent to May 28, 2002 has been disclaimed.

[21] Appl. No.: 796,708

[22] Filed: Nov. 12, 1985

[51] Int. Cl.$^4$ ................................................ C08J 3/00
[52] U.S. Cl. ...................... 523/336; 523/339; 524/547; 524/548; 524/516; 524/484; 524/481; 137/13
[58] Field of Search ................ 523/336, 339; 524/547, 524/548, 516, 484, 481

[56] References Cited

U.S. PATENT DOCUMENTS

| | | | |
|---|---|---|---|
| 2,770,603 | 11/1956 | Lynch | 524/548 |
| 2,795,567 | 6/1957 | Ruehrwein | 524/548 |
| 3,423,358 | 1/1969 | Burke, Jr. | 524/548 |
| 3,700,619 | 10/1972 | Burke, Jr. | 524/548 |
| 3,836,511 | 9/1974 | O'Farrell et al. | 525/353 |
| 3,950,294 | 4/1976 | Connelly et al. | 524/577 |
| 4,076,699 | 2/1978 | Grimand et al. | 525/333.5 |
| 4,107,132 | 8/1978 | Burke, Jr. | 524/548 |
| 4,163,740 | 8/1979 | Malassine et al. | 524/548 |
| 4,254,016 | 3/1981 | Qmizawa | 524/548 |
| 4,263,419 | 4/1981 | Piestert et al. | 525/309 |

*Primary Examiner*—Joseph L. Schofer
*Assistant Examiner*—N. Sarofim
*Attorney, Agent, or Firm*—Richard E. Nanfeldt

[57] ABSTRACT

The present invention relates to a family of novel and efficient drag reduction agents for a variety of organic solutions which comprise a family of polymeric complexes (i.e., polyampholytes) which are terpolymers of styrene/metal styrene sulfonate/n-vinylpyridine (NVP).

The metal styrene sulfonate is an anionic monomer, while n-vinylpyridine is a base which becomes chemically coordinated to the metal ion. These styrene-based polyampholytes have approximately 1 to about 50 mole percent of the NVP moiety present within the macromolecular structure. These groups are not necessarily present in an equimolar charge ratio. The excess NVP allows for facile dispensability or solubility of the polyampholytes into the organic liquid.

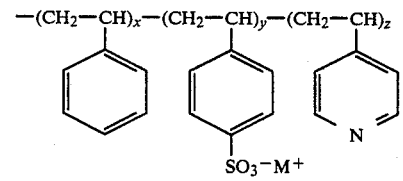

wherein M is a metal cation selected from the group consisting of Group IA, IIA and IB and IIB of the Periodic Table of Elements; x is 40 to about 98 mole percent; y is about 1 to about 50 mole percent; and z is about 1 to about 50 mole percent; wherein y and z are less than 60 mole percent.

4 Claims, No Drawings

DRAG REDUCTION WITH NOVEL HYDROCARBON SOLUBLE POLYAMPHOLYTES

FIELD OF THE INVENTION

The present invention relates to a family of novel and efficient drag reduction agents for a variety of organic solutions which comprise a family of polymeric complexes (i.e., polyampholytes) which are terpolymers of styrene/metal styrene sulfonate/n-vinylpyridine (NVP).

The metal styrene sulfonate is an anionic monomer, while n-vinylpyridine is a base which becomes chemically coordinated to the metal ion. These styrene-based polyampholytes have approximately 1 to about 50 mole percent of the NVP moiety present within the macromolecular structure. These groups are not necessarily present in an equimolar charge ratio. The excess NVP allows for facile dispensability or solubility of the polyampholytes into the organic liquid.

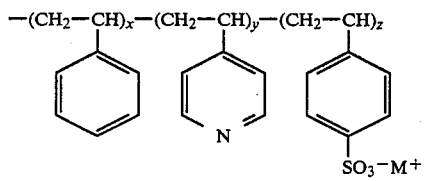

wherein M is a metal cation selected from the group consisting of Group IA, IIA and IB and IIB of the Periodic Table of Elements; x is 40 to about 98 mole percent; y is about 1 to about 50 mole percent; and z is about 1 to about 50 mole percent; wherein y and z are less than 60 mole percent.

BACKGROUND OF THE INVENTION

To flow liquids in pipes, energy must be expended to overcome frictional losses. This energy is extracted from the liquid pressure, which decreases along the pipe in the direction of flow. For a fixed pipe diameter, these pressure drops increase with increasing flow rate until a maximum is reached when the pressure drop along the pipe equals the supply pressure at the beginning of the pipe. When flow in the pipe is turbulent (flow Reynolds number = mean fluid velocity × pipe diameter ÷ fluid kinematic viscosity greater than about 2000) this maximum flow rate can be increased by the addition of small amounts of certain high molecular weight linear polymers to the liquid. These polymers interact with the turbulent flow processes and reduce frictional pressure losses such that the pressure drop for a given flow rate is less, or the maximum flow rate for a given pressure drop is larger. This phenomenon is commonly called drag reduction. It has been successfully used in commercial oil pipelines, fire hoses and storm sewers to increase the flow capacities of existing systems. It can also be used to reduce supply pressures, pumping costs, and/or pipe diameters for given flow capacities.

High molecular weight hydrocarbon soluble polymers such as polyisobutylene, polystyrene, and several poly alpha-olefins have been demonstrated to reduce drag in turbulent flows of hydrocarbon liquids. Generally, the drag reduction effectiveness of these polymers improves with increasing molecular weight; however, the tendency for the polymers to permanently degrade via molecular scission within pumps or turbulent piperflows also increases with increasing polymer molecular weight. This invention discloses efficient drag reduction in hydrocarbon liquids resulting from a novel class of interacting polymers which interact via a coordination chemistry-type mechanism. For example a terpolymer of a metal (i.e. transition metal) neutralized styrene sulfonate can interact with styrenevinylpyridine monomer units chemically attached to the same polymer chain molecule. Such coordination-type interacting polymers can provide improved drag reduction via formation of higher molecular weight entitles or even a polymeric networks rather than by high molecular weight. Consequently such larger molecular weight structures of networks can be less sensitive to flow degradation due to the ability of the coordination-type bonding to absorb energy from the fluid itself in a reversible manner. These bonds will break and subsequently reform in a flowing fluid, reducing the stress on an individual chain and, therefore, preventing a substantial and permanent deterioration in the molecular weight, especially as compared to its non-associating or non-coordinating counterpart.

This invention teaches that a polyampholyte can be effective as a drag-reducing agent for hydrocarbon solutions. Such a polyampholyte can behave like a higher molecular weight polymer which is normally needed for drag reduction. One can, therefore, form a network from polymers that are relatively low in molecular weight and potentially reduced sensitivity to backbone degradation under flow. Moreover, the network cannot be completely destroyed by adding a small amount of a polar cosolvent additive, such as an alcohol or other polar additives, which normally strongly interferes with the interaction mechanism.

In recent years there has been a renewed interest in the physical properties of polymeric complexes (i.e., polyampholytes). These materials have a variety of interesting properties since, for all practical purposes, the cations and anions are chemically attached to the molecular structure of the macromolecules. The counterions of any type are not free to move into the bulk solution as found in classical polyelectrolytes. In addition, it is generally assumed that each individual polymer chain possesses an equal number of cations and anions.

Salamone, et al., the University of Lowell (Massachusetts) are investigating ampholytic polymers as a part of their research program. They have studied the solution properties of divinylic cationic-anionic monomer pairs and also cationic-anionic monomer pairs with a neutral comonomer (*J. Poly. Sci.* A1, 18 2983 [1980]) which can be incorporated into the ampholytic macromolecular structure through both solution or emulsion polymerization schemes. Apparently, other neutral vinylic monomers (i.e., acrylamide) were also polymerized (Gordon Research Conference—1981); but as of the present time reports of this work have not been published in the scientific literature. However, in all of Salamone's work detailed descriptions of his synthesis is reported. In all instances the polymerization of the anionic-cationic monomeric species occurred via "ion-pair comonomers that have no nonpolymerizable counterions present" (*J. Poly. Sci.-Letters*, 15, 487 [1977]). Apparently, the physical and chemical properties of these ion-pair comonomers are different than the individual ions (*J. Poly. Sci.-Letters*, 15, 487 (1977).

Polymeric materials are generally considered useful as viscosification agents when dissolved in an appropriate solvent system. The major reason for this viscosity enhancement is due to the very large dimensions of the individual polymer chain, as compared to the dimension of the single solvent molecules. Any increase in the size of the polymer chain will produce a corresponding enhancement in the viscosity of the solution. This effect is maximized when the polymer is dissolved in a "good" solvent. Therefore, in general, a hydrocarbon soluble polymer is useful for thickening hydrocarbon solvents, while a water soluble polymer is appropriate for increasing the viscosity of aqueous systems. With regard to nonaqueous solutions, hydrocarbon based solvent soluble nonionic polymers and low charge density sulfonated isomers are quite useful in this regard and are commonly used materials. However, the solution properties of the former family of materials are controlled primarily through modification of the molecular weight of the polymer and through changes in the level of dissolved polymer. These materials become especially effective at concentrations where the individual polymer chains begin to overlap. This "transition" is commonly referred to in the literature as the chain overlap concentration, or simply C*. It should be noted that in most nonionic polymers of commercial interest a relatively large amount of polymer is required prior to reaching C*. Therefore, this approach is undesirable from an economic viewpoint. Moreover, the rheological properties of many of these nonionic systems have been published. The results of these studies show that, in general, these solutions are shear thinning over all shear rates investigated.

With regard to lightly sulfonated ionomers, the viscosification efficiency of these materials are primarily controlled through formation of an ionically-linked network structure. As long as this network structure remains in tact the sulfonated ionomers possess outstanding viscosity characteristics, such as improved thickening efficiency, especially as compared to its nonionic counterpart, and shear thickening. However, these ionic interactions can be dramatically weakened and even completely eliminated if a polar cosolvent, such as an alcohol or an amine, is dissolved into the solution system. However, it should be noted that a polar cosolvent is required in a number of these materials for solvation to occur. Typically, insolubility in xylene (i.e., inability to form a homogeneous single phase solution) occurs in a low charge density sulfonate ionomer solution if the sulfonation level is greater than approximately 1.0 mole percent. A direct consequence of the addition of these polar cosolvents is a corresponding reduction in solution properties, such as thickening efficiency and drag reduction. For example, shear thickening is completely eliminated or sharply reduced in magnitude at relatively low levels of methanol.

This invention teaches that a low charge density sulfonate-containing polyampholytes (example: styrene-styrene sulfonate-4 vinylpyridine terpolymers) are readily soluble in single component, nonaqueous solvents. A polar cosolvent is not always required for solvation to take place. Due, in part, to this solubility characteristic, these materials are useful in drag reduction applications.

SUMMARY OF THE INVENTION

The present invention relates to improved drag reduction agents for hydrocarbon solutions. The drag reduction agents of the instant invention are low charge density polyampholytes which are terpolymers of styrene/4-vinylpyridine/metal (such as zinc) neutralized styrene sulfonate.

GENERAL DESCRIPTION

The present invention relates to a method for reducing the frictional drag of an organic hydrocarbon liquid in flow through pipes or conduits having a continuous bore therethrough, which method comprises adding a quantity of a polyampholyte to the organic hydrocarbon liquid, wherein the polyampholyte is a terpolymer of styrene/vinyl-pyridine/metal (such as zinc) neutralized styrene sulfonate.

The polyampholytes of the instant invention are terpolymers of a nonionic monomer, a sulfonate-containing monomer and an amine-containing monomer. The terpolymers of the instant invention are formed by a free radical polymerization of the amine-containing monomer and the nonionic monomer to form a copolymer of the nonionic monomer and the amine-containing monomer. This copolymer is subsequently sulfonated according to the procedures of U.S. Pat. No. 3,642,728, which is hereby incorporated by reference, to form the terpolymer of the nonionic monomer, the sulfonate-containing monomer and the amine-containing monomer.

A suitable oil soluble, water insoluble terpolymer of the instant invention is styrene/metal styrene sulfonate/vinylpyridine which has the formula:

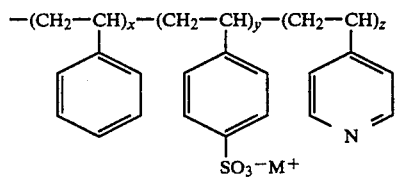

wherein x is about 40 to about 98 mole percent, more preferably about 50 to about 95 mole percent, and most preferably about 80 to about 90; y is about 1 to about 50 mole percent, more preferably about 2 to about 20 mole percent, and most preferably about 2 to about 10 mole percent; and z is about 1 to about 50 mole percent, more preferably about 2 to about 20, and most preferably about 2 to about 10; wherein y and z are less than 60 mole percent and M is an amine or a metal cation selected from the group consisting of aluminum, iron, lead, Groups IA, IIA, IB and IIB of the Periodic Table of Elements.

The molecular weight, as derived from intrinsic viscosities, for the terpolymers of styrene/metal styrene sulfonate/vinylpyridine is about $1 \times 10^3$ to about $5 \times 10^7$, more preferably about $1 \times 10^4$ t about $2 \times 10^7$, and most preferably about $1 \times 10^5$ to about $1 \times 10^7$. The means for determining the molecular weights of the oil soluble, a water insoluble terpolymer from the viscosity of solutions of the terpolymers comprises the initial isolation of the hydrocarbon soluble terpolymers, purification and redissolving the terpolymers in a nonaqueous solvent to give solutions with known concentrations. The flow times of the solutions and the pure solvent were measured in a standard Ubbelholde viscometer. Subsequently, the reduced viscosity is calculated through standard methods utilizing these values. Extrapolation to zero polymer concentration leads to the intrinsic viscosity of the polymer solution. The intrinsic viscosity is directly related to the molecular weight through the well-known Mark Houwink relationship.

The styrene/vinylpyridine copolymer is formed by free radical copolymerization using techniques well-known in the polymer literature. Such polymers can be prepared by a variety of techniques by reacting the amine-containing monomer (vinylpyridine) with monomers collected from the group consisting of styrene, t-butyl styrene, alkyl acrylates, alkyl methacrylates, butadiene, isoprene vinyl chloride, acrylonitrile, acrylonitrile/butadiene/styrene monomer mixtures and copolymers, or more complex mixtures. An emulsion polymerization process is generally preferred, but other processes are also acceptable.

The vinylpyridine content of the preferred copolymer of styrene and vinylpyridine is about 1 to about 50 mole percent, more preferably about 2 to about 20 mole percent, and most preferably about 2 to about 10 mole percent. The number average molecular weight measured by GPC is about 10,000 to about 10,000,000, preferably about 20,000 to about 5,000,000, and most preferably about 30,000 to about 2,000,000.

The amine-containing copolymer is typically a polymeric backbone where the nitrogen elements are in the chain or pendant to it. Such a polymer may be obtained by direct copolymerization of a monomer containing the basic moiety with other monomers, or by grating a monomer containing the basic moiety on to a polymerized chain. Monomers can be chosen from vinyl monomers leading to hydrocarbon soluble polymers, such as styrene, t-butyl styrene, acrylonitrile, isoprene, butadiene, acrylates, methacrylates and vinyl acetate. Monomers containing a basic moiety will be those which contain amine or alkyl amine groups or pyridine groups, such as vinylpyridine.

The amount of vinylpyridine in the amine-containing copolymer can vary widely, but should range from less than 0.01 percent down to at least 10 weight percent.

Preferably, the amine content in the amine-containing copolymer is expressed in terms of basic nitrogen. In this respect, the nitrogen content in amides and similar non-basic nitrogen functionality is not part of the interacting species.

A minimum of three basic groups must be present on the average per polymer molecule and the basic nitrogen content generally will range from 4 meq. per 100 grams of polymer up to 500 meq. per 100 grams. A range of 8 to 200 meq. per 100 grams if preferred.

The amine-containing copolymer of styrene and vinylpyridine is sulfonated according to the procedure of U.S. Pat. No. 3,642,728, which is herein incorporated by reference, to form the terpolymer of styrene/styrene sulfonic acid/vinylpyridine which is subsequently neutralized with an amine or metal cation to form the terpolymer of styrene/neutralized styrene sulfonate/vinylpyridine.

The number of sulfonate groups contained in the terpolymer is a critical parameter affecting this invention. The number of sulfonate groups present in the polymer can be described in a variety of ways, such as weight percent, mole percent, number per polymer chain, etc. For most polymer systems of interest in this invention it is desirable to employ mole percent. An alternate way of expressing this is to state the sulfonate level in terms of milliequivalents (meq.) of sulfonic acid groups per 100 grams of polymer. This latter procedure provides a rapid and independent measure of sulfonic acid content in a polymer through simple titration.

Both mole percent sulfonate and milliequivalent of sulfonate will be employed to describe the sulfonate polymers employed in this invention.

In general, the terpolymer will comprise from about 1 meq. up to 500 meq. of sulfonate groups per 100 grams of polymer, more preferably about 10 meq. to about 100 meq. of sulfonate groups per 100 grams of polymer. The unneutralized sulfonate terpolymers in the instant invention are neutralized with the basic materials selected from the group consisting of Groups IA, IIA, IB and IIB of the Periodic Table of Elements and lead, tin and antimony. A preferred counterion for this invention is zinc, as hereafter explained.

Neutralization of the unneutralized sulfonated terpolymers with appropriate metal hydroxides, metal acetates, metal oxides, etc. can be conducted by means well known in the art. For example, the sulfonation process of the copolymer containing a small 0.3 to 1.0 mole percent unsaturation can be conducted in a suitable solvent, such as 1,2-dichloroethane with acetyl sulfate as the sulfonating agent. The resulting sulfonic acid derivative can then be neutralized with a number of different neutralization agents, such as sodium phenolate and similar metal salts. The amounts of such neutralization agents employed will normally be stoichiometrically equal or in some excess to the amount of free acid in the polymer plus any unreacted reagent which still is present. It is preferred that the amount of sulfonating agent originally employed plus 10% more to ensure full neutralization of all sulfonic acids present. The use of more of such neutralization agent is not critical. Sufficient neutralization agent is necessary to effect at least 50% neutralization of the sulfonic acid groups present in the polymer, preferably at least 90%, and most preferably essentially complete neutralization of such acid groups should be affected.

The degree of neutralization of said sulfonate groups may vary from 50 to 500 mole percent, preferably 90 to 200%. It is preferred that the degree of neutralization be substantially complete, that is, with no substantial free acid present and without substantial excess of the base other than that needed to ensure neutralization. Thus, it is clear that the polymers which are utilized in the instant invention comprise substantially neutralized pendant groups and, in fact, an excess of the neutralizing material may be utilized without defeating the objects of the instant invention.

We have surprisingly found that a very important factor in determining the strength of the interaction between the sulfonate groups, amine-containing groups in the terpolymer is the nature of the counterion. There are, broadly speaking, three major classes of such counterions. The first class, which are less preferred, are those metals of Group I and Group IIA, which include Li, Na, K, etc., Be, Mg, Ca, etc. We have found that these species do not interact as strongly with amine groups as the more preferred species described below. Those metals are commonly defined as members of the transition elements (see chemical test: *Chemical Principles and Properties,* by M. J. Sienko and R. A. Plane, McGraw Hill Book Co., 1974, page 19). These metal cations are best exemplified by zinc and interact strongly with pyridine and similar amines. As a consequence, a zinc neutralized sulfonate group interacts much more strongly with the vinylpyridine in the terpolymer than does a magnesium or sodium neutralized system. It is for this reason that the transition elements are preferred with zinc, copper, iron, nickel and cobalt being especially preferred. We also include antimony and lead as suitable cations.

A third species which is preferred is the free sulfonic acid of the terpolymer, which will also interest with the vinylpyridine. In this latter case, it is clear that the interaction is a classic acid-base interaction, while with the transition metals a true coordination complex is created which is due to the donation of the electron pair of the nitrogen element. This distinction is a very important one and sets these polyampholytes apart from classic acid-base interactions. The surprising observation is that such coordination complexes can form in such extreme dilution insofar as interacting groups are concerned, and that they are apparently formed so far removed from their expected stoichiometry (based on small molecule analogs). Therefore, only those polymer backbones (i.e., as measured in the absence of ionic groups) having a solubility parameter less than 10.5 are suitable in this invention.

The polyampholyte as a drag reduction agent is incorporated into the organic hydrocarbon liquid at a concentration level of about 0.001 to about 0.5 grams of polyampholyte per 100 ml. of the organic hydrocarbon liquid, more preferably about 0.005 to about 0.1.

DESCRIPTION OF THE PREFERRED EMBODIMENTS

The following examples illustrate the present invention without, however, limiting the same hereto.

EXAMPLE 1

A representative example for the synthesis of the styrene-4-vinylpyridine copolymer which is subsequently sulfonated to form the polyampholyte is described below.

Into a one liter, four neck flask add:
50 g styrene
3.2 g sodium laurylsulfate
120 ml distilled water
0.2 g potassium persulfate
2.1 g 4-vinylpyridine The solution was purged with nitrogen gas for one hour to remove dissolved oxygen. As the nitrogen gas purging began, the solution was heated to 50° C. After 24 hours the polymer was precipitated from solution with a large excess of acetone. Subsequently, the polymer is washed several times with acetone and dried in a vacuum oven at 60° C. for 24 hours. Elemental analysis showed that the copolymer contained 4.1 mole percent 4-vinylpyridine.

EXAMPLE 2

A representative example for the sulfonation of the styrene-4-vinylpyridine copolymer is described below. It is noted that this sulfonation route is described in U.S. Pat. No. 3,870,841 (issued 1975 to Exxon Research and Engineering Company).

The following procedure was generally followed: 10 g of the copolymer were dissolved in 200 ml of 1,2-dichloroethane. The solution was heated to 50° C. and the requisite amount of sulfuric acid and acetic anhydride was added, in this case 4.2 mmoles of concentrated sulfuric acid and 6.9 mmoles of acetic anhydride. The solution was stirred for 60 minutes at 50° C. and the reaction was terminated by the addition of 12 ml of methanol. Sufficient zinc acetate (diluted with methanol) was added to neutralize all acid present. The polymer solution was precipitated into a substantial excess of methanol with vigorous agitation, followed by filtration and washing with methanol. The product was then vacuum dried. Analyses were conducted for sulfur and zinc. The level of sulfonate incorporated was determined by sulfur analysis. Elemental analysis shows that 1.5 mole percent sulfonate groups was incorporated into the polymer chain structure.

It should be noted that it is possible to neutralize the free acid of the polyampholyte with a variety of metal acetates, hydroxides, methoxides, and the like, through neutralization scheme previously described.

EXAMPLE 3

Table 1 shows the solubility characteristics of a sulfonated polystyrene-zinc salt (Zn-SPS) and a sulfonate-containing polyampholyte (ZN-polyampholyte) at essentially equivalent charge densities.

TABLE 1

| Comparison of the Solubility of Zn—SPS With the Corresponding Zn—Polyampholyte | | | |
|---|---|---|---|
| Polymer | Sulfonation Level (Mole %) | Base Level (Mole %) | Solubility |
| Zn—SPS | 1.8 | 0.0 | Insoluble |
| Zn—Polyampholyte | 1.5 | 4.1 | Soluble |

These results confirm that the solubility of a sulfonate-containing ionomer is markedly improved with the incorporation of base-containing monomer units, such as 4-vinylpyridine, within the polymer chain structure. This behavior has a profound and unexpected effect on the drag reducing properties of these ion-containing polymers.

EXAMPLE 4

Drag Reduction of Novel Hydrocarbon Soluble Polyampholytes

Drag reduction was evaluated by flowing polymer/xylene solutions through a 2.13 mm inside diameter stainless steel tube and measuring the resulting frictional pressure drop. The flows were generated by loading a pair of stainless steel tanks (1 liter each) with a previously dissolved polymer/xylene solution, pressuring the tanks with nitrogen gas (300 kPa) and discharging the solution through the tube test section. Pressure drops were measured across a 50 cm straight segment of the tube with a pair of flush mounted tube wall pressure taps and a differential pressure transmitter. Flow rates were measured by weighing samples of the effluent liquid collected over measured time periods.

Flow rates in the drag reduction experiments ranged from about 12 to 20 g/s; these corresponded to solvent Reynolds numbers from about 12,000 to 20,000 (solvent Reynolds number=mean flow velocity × tube diameter divided by solvent kinematic viscosity). Drag reduction was measured by comparing flow rates of the polymer/xylene solutions with flow rates of the xylene solvent at equal pressure drops. Results were expressed as percent flow enhancement which is defined as follows:

$$\text{Percent Flow Enhancement} = \frac{\text{Flow Rate (Solution)} - \text{Flow Rate (Solvent)}}{\text{Flow Rate (Solvent)}} \times 100$$

Typical drag reduction results from experiments with a novel polyampholyte and its styrene/vinylpyridine copolymer backbone are given in Table 2. The data show that the polyampholyte terpolymer is significantly more effective than its non-associating copolymer backbone and that its effectiveness is only modestly decreased by the addition of a moderate amount of methanol to the xylene solution. Both results suggest that the improved flow enhancement of the polyampholyte is due to increased ionic intermolecular associations in this flow field. These inter-associations build larger polymer aggregates which are more effective drag reducers. They also can be partially disrupted by polar solvent components. Such drag reduction behavior cannot be obtained with styrene homopolymers sulfonated to a similar extent since the latter ionomers are not soluble in hydrocarbon solvents at that charge density (as described in Example 3) and since polymer solubility is a requirement for drag reduction activity.

TABLE 2

Drag Reduction Data for Novel Hydrocarbon Solvent Soluble Polyampholytes

| Polymer | Polymer Concentration (ppm) | Solvent | % Flow Enhancement @ Pressure Gradient of 112 kPa/m |
|---|---|---|---|
| Backbone Copolymer[1] | 500 | Xylene | 17 |
| Polyampholyte[2] | 500 | Xylene | 62 |
| Polyampholyte | 500 | Xylene plus 2% Methanol | 48 |

[1]Styrene/4-vinylpyridine copolymer with 4.1 mole % 4-vinylpyridine and molecular weight of approximately $1 \times 10^6$.
[2]Above copolymer with approximately 1.5 mole % of the zinc salt of sulfonated styrene.

What is claimed is:

1. A method for reducing the frictional drag of an organic liquid in flow through pipes or conduits having a continuous bore therethrough which comprises adding about 0.001 to about 0.5 grams of a polyampholyte to 100 ml of said organic liquid, wherein the polyampholyte has the formula of:

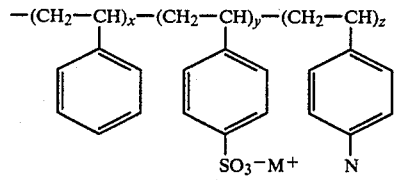

wherein M is a metal cation selected from the group consisting of Group IA, IIA and IB and IIB of the Periodic Table of Elements; x is 50 to about 98 mole percent; y is about 1 to about 50 mole percent; and z is about 1 to about 50 mole percent; wherein y and z are less than 60 mole percent, wherein the sum of x, y and z is 100 mole percent.

2. A method according to claim 1 wherein said polyampholyte is hydrocarbon soluble.

3. A method according to claim 1 wherein M is zinc.

4. A polymeric solution comprising:
 (a) a non-polar hydrocarbon liquid; and
 (b) about 0.001 to about 20 weight percent of a polyampholyte having the formula:

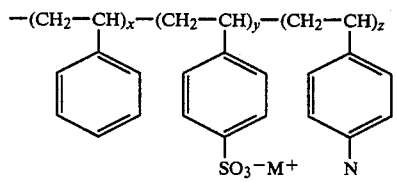

wherein x is about 50 to about 98 mole percent; y is about 1 to about 50 mole percent; and z is about 1 to about 50 mole percent; wherein y and z are less than 60 mole percent; and M is an amine or a metal cation selected from the group consisting of aluminum, iron, lead, Groups IA, IIA, IB and IIB of the Periodic Table of Elements, wherein the sum of x, y and z is 100 mole percent.

* * * * *